Sept. 28, 1937.    M. A. BOSTWICK    2,094,346
AUTOMATIC NETWORK PROTECTOR
Filed Aug. 24, 1935    2 Sheets-Sheet 1
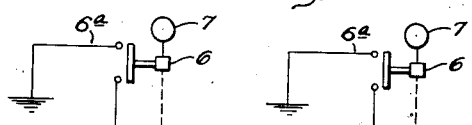
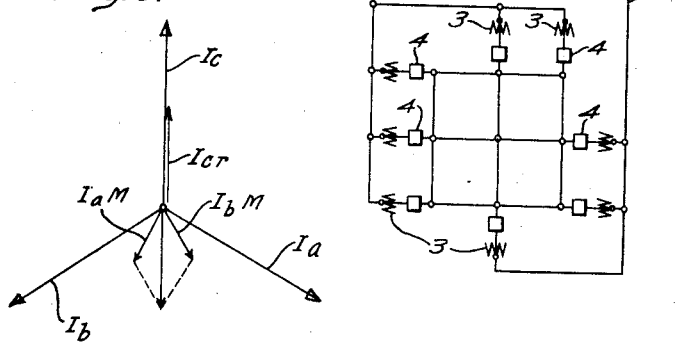
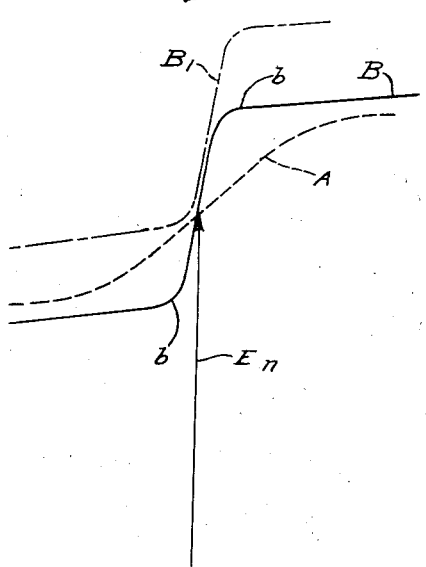
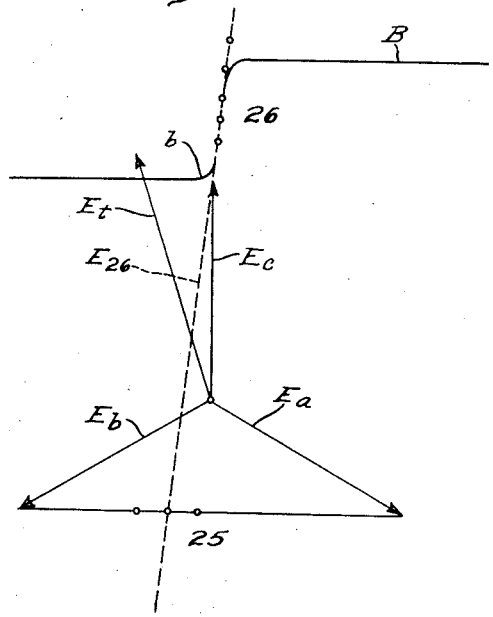
WITNESSES:
INVENTOR
Myron A. Bostwick.
BY
ATTORNEY Sept. 28, 1937.        M. A. BOSTWICK        2,094,346
AUTOMATIC NETWORK PROTECTOR
Filed Aug. 24, 1935        2 Sheets-Sheet 2
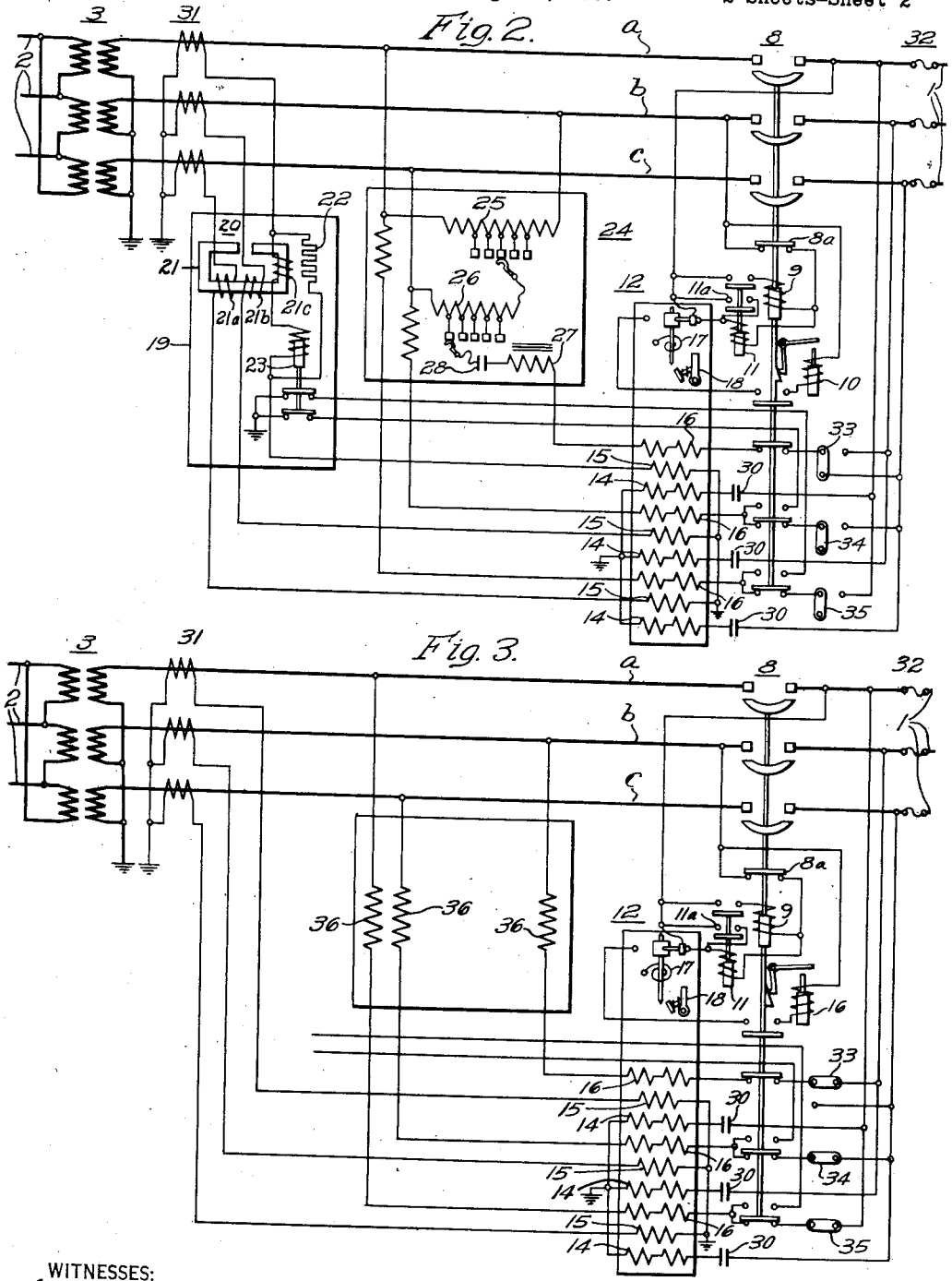
WITNESSES:
C. J. Weller.
G. O. Harrison
INVENTOR
Myron A. Bostwick.
BY
ATTORNEY Patented Sept. 28, 1937

2,094,346

UNITED STATES PATENT OFFICE 2,094,346

AUTOMATIC NETWORK PROTECTOR

Myron A. Bostwick, North Arlington, N. J., assignor to Westinghouse Electric & Manufacturing Company, East Pittsburgh, Pa., a corporation of Pennsylvania Application August 24, 1935, Serial No. 37,718

10 Claims. (Cl. 175—294)

My invention relates to alternating current distribution apparatus, and particularly to automatic network protectors for use in network distribution systems.

The alternating current network distribution system consists of a network or grid of interconnected secondary mains supplied by means of a plurality of feeders through step down transformers. An automatically controlled circuit breaker known as a "network protector", is interposed in the secondary leads of each transformer bank, for the purpose of entirely disconnecting a feeder from the network in the event of a high tension fault in the feeder or in a transformer bank.

The control apparatus for the network protector includes a master relay which operates upon the power directional principle, when the circuit breaker is closed, to open the circuit breaker in the event of reverse power flow above a predetermined magnitude, and to reclose the circuit breaker when the relationship of feeder and network voltages is such that the flow of power immediately following the closure of the circuit breaker will be from the feeder to the network.

The master relay may be set to respond to a comparatively small magnitude of reverse power flow, such as 1 or 2% of the rating of the associated transformer bank, in order to permit the opening of all of the network protectors connected to a feeder by merely opening the feeder breaker. On the other hand, the reverse power setting may be made sufficiently large so that the network protector opens only in the event of an abnormally large reverse power flow such as is occasioned by a high voltage fault.

In the event that the smaller reverse power setting is used, difficulty may be experienced in maintaining the network protector closed, if the system is supplied by more than one source, because of the reverse power flow which will occur in this kind of a system following the usual laws of current distribution in a network. The same difficulty may be experienced in a network system supplied from a single source if certain forms of feeder regulators are used for controlling the network voltage. In such applications it is the usual practice to provide an auxiliary relay, known as a phasing relay, which serves to limit the range of phase angles of feeder voltage, with reference to network voltage, in which closure of the network protector can occur. The usual arrangement of master relay and phasing relay provides for closure of the network protector only if the feeder voltage terminates in a range of phase angle positions corresponding roughly to the upper left quadrant with reference to the network voltage.

The phasing relay, although satisfactory in operation, is objectionable from the standpoint of cost.

It is an object of my invention to provide a novel arrangement of impedances which I shall term a phasing filter, for the purpose of limiting the range of closing voltages of a network master relay, in the same manner as a phasing relay, and which will act as a satisfactory substitute for the latter.

Another object of my invention is to provide a novel automatic network protector in which a complete change-over from operation with low reverse power setting to operation with high reverse power setting, can be effected without disturbing the permanent wiring of the protector.

Another object of my invention is to provide an automatic protector in which the reverse power setting required for an opening operation will be of comparatively large magnitude, but which may be opened without creating a serious reverse power flow on the feeder, when it is desired to disconnect the feeder at times of light load.

Other objects of my invention will become evident from the following detailed description taken in conjunction with the accompanying drawings, in which Figure 1 is a diagrammatic view of a network distribution system;

Fig. 2 is a diagrammatic view of an automatic network protector embodying my invention, to be used in a network distribution system, as shown in Fig. 1;

Fig. 3 is a diagrammatic view of a modification of the automatic network protector shown in Fig. 2;

Fig. 4 is a vector diagram illustrating the phasing curves obtained in the practice of my invention;

Fig. 5 is a vector diagram illustrating the effect of various adjustments of the automatic network protector shown in Fig. 2; and Fig. 6 is a vector diagram illustrating the operating characteristics of the protector shown in Fig. 2.

Referring to Fig. 1, the network 1, or grid of secondary mains is supplied by means of a plurality of feeders 2 through banks of step down transformers indicated diagrammatically at 3. The automatic network protectors 4 are interposed in the secondary leads of the banks of transformers 3 and serve the purposes pointed out above. The feeders 2 are controlled by suitable feeder circuit breakers 6, interposed between the feeders 2 and one or more sources 7, which may be generating stations or existing sub-stations. A suitable source of negative sequence current, such as a device for establishing a ground on one conductor of the feeder 2 when the corresponding circuit breaker 6 is open, is indicated diagrammatically at 6a in connection with each of the circuit breakers 6.

The control apparatus of an improved network protector of my invention is shown in detail in Fig. 2. In this figure, the transformer bank 3 is shown connected in delta on the feeder side to the feeder 2, and in star with neutral grounded on the low voltage side. The network circuit breaker 8, interposed in the secondary leads of the transformer bank 3 may be of any suitable type for controlling the flow of currents which may be expected, and is provided with the usual closing motor or solenoid 9 and trip coil 10.

A closing contactor 11 is provided for controlling the energization of the closing solenoid 9. The closing contactor 11 is provided with auxiliary front contacts 11a for establishing a holding circuit for itself, independent of the master relay 12.

A network master relay 12 is provided for controlling the opening and closing of the circuit breaker 8.

The master relay 12 may be of one of the usual induction forms involving a rotating magnetic field acting upon a conducting element such as an induction disk or an induction drum, but is preferably of the inductor loop type disclosed in my copending application Serial No. 40,389, filed Sept. 13, 1935, and assigned to the Westinghouse Electric & Manufacturing Company. As explained in the above-mentioned copending application, this relay consists of three inductor loop elements energized in accordance with electrical parameters derived from the three network phases. This relay is provided with potential windings 14, current windings 15, and phasing windings 16 for the three phases, as described in detail in the above-mentioned application. The inductor loops (not shown) are mechanically connected on a common shaft for the purpose of operating the relay contacts.

The shaft of the relay 12 is biased to the closing position by means of a spring 17. An overvoltage adjusting device 18 is provided for overcoming the bias of the spring and opening the closing contacts of the relay when the potential coils 14 are energized from the network 1, as explained in the above-mentioned application. As the specific construction of the overvoltage adjusting device 18 forms no part of the present invention, a detailed description thereof is for simplicity omitted.

An unbalanced-current restraining device 19 is provided for establishing a torque in the relay 12 tending to maintain the closing contacts of the latter relay closed when the network circuit breaker 8 is closed and the circuit conditions are normal. In the event that the feeder circuit breaker (not shown in Fig. 2) is open and a suitable source of negative sequence current connected to the feeder 2, the restraining device 19 operates to open the restraining connections of the master relay 12, to thereby permit opening of the network circuit breaker 8 without establishing a severe disturbance on the feeder 2. Under these conditions the network master relay 12 responds to the magnetizing losses of the transformer bank 2, which flow from the network 1 in reverse direction, and operates to trip the network circuit breaker 8 to open position.

The restraining device 19 may be designed to respond to pure negative sequence current or to any other unbalanced current function suitable for discriminating between normal load conditions and the unsymmetrical condition of feeder charging current produced when the feeder breaker is open and one feeder conductor is grounded. In the form shown, the device 19 comprises an unbalanced current filter 20 of the general type disclosed in the United States patent to B. E. Lenehan, No. 1,936,797 issued November 28, 1933 and a current responsive relay 23. The filter 20 comprises an iron core mutual reactance device 21 having two primary windings 21a and 21b and a secondary winding 21c. The core of the device 21 is provided with an air gap and is of limited cross-sectional area so as to saturate at current values slightly above the normal full load of transformer bank 3.

The impedance relationships of the filter 20 are as follows: Assuming that the magnitude of resistance 22 is $r$, the unsaturated mutual impedance of the secondary winding 21c to each of the primary windings 21a and 21b is $$\frac{1}{\sqrt{3}}$$

The primary windings 21a and 21b are connected in opposite directions so as to produce secondary voltages lagging with reference to the $a$-phase line current and leading with reference to the $b$-phase line current respectively. The vector relationship of variables in the filter 20 during balanced current conditions is indicated in Fig. 6.

In this figure the balanced line currents are indicated as vectors $I_a$, $I_b$ and $I_c$. The voltage drop in the resistor 22 is indicated as the vector $I_c r$. The secondary voltage components induced in the secondary winding 21c are indicated as vectors $I_a M$ and $I_b M$. It will be seen that the vector sum of $I_c r$, $I_a M$ and $I_b M$ is zero, so that for balanced line currents no current flows in the coil of the relay 23 as long as the device 21 remains unsaturated. When the device 21 becomes saturated by line currents above the rating of transformer bank 3 (Fig. 2), the $ir$ drop in the resistor 22 exceeds the sum of the secondary induced voltages of the device 21, and the relay 23 opens. Similarly, the relay 23 opens in response to any material unbalance of the line currents, even though the device 21 is not saturated.

The unbalanced current device, as described above, responds to a quantity dependent upon both negative and zero sequence current components. However, in the event of a fault on the feeder 2, the delta connection of transformers 3 prevents the flow of zero sequence currents to the fault. If accurate operation is desired under all conditions, the secondary windings of current transformers 31 are preferably connected in delta, in which case the effect of zero sequence current is eliminated.

A phasing filter 24, for which there is no equivalent in the prior art, is connected to the phasing winding 16 of the master relay 12, for producing a distortion of the master relay phasing characteristics of such nature as to eliminate the necessity for a separate phasing relay. The phasing filter 24 consists of a pair of tapped autotransformers 25 and 26 connected to the secondary leads of the transformer bank 3 in the general form of a Scott connection. The auto-transformer 25 is connected phase-to-phase across one delta phase of the secondary terminals of transformer bank 3, and the auto-transformer 26 is connected between the remaining secondary transformer terminal and the tap changing device of the auto-transformer 25. A phasing circuit consisting of one of the phasing windings 16, a saturable reactor 27, and a capacitor 28 is connected between the tap changing device of the auto-transformer 26, and a phase of the network 1.

The saturable reactor 27 is so designed as to have a reactance substantially equal to that of the capacitor 28, when the voltage impressed on their common phasing circuit is low. When the phasing voltage increases however, the reactor 27 saturates, thereby reducing the inductive reactance as compared with the capacitive reactance of the circuit and producing a leading phase angle therein. The losses of the various elements included in this phasing circuit are made small, so that the change of phase angle upon saturation of the reactor 27 will be abrupt in order to produce sharp bends in the phasing curves.

The operation of the phasing filter 24 may better be understood by reference to Fig. 4 which shows the form of phasing curves produced. Referring to Fig. 4, a bent closing characteristic of the form described in my prior United States Patent No. 1,982,337, issued Nov. 27, 1934, and assigned to the Westinghouse Electric & Manufacturing Company, is shown at A. As explained in the above-mentioned patent, the bends in this closing curve are produced by saturation of a saturable reactor in a phasing circuit similar to that described above. However, the phasing circuit described in the above-mentioned patent is of comparatively high resistance which leads to rather gradual bends in the curve A. The present phasing circuit differs from that of the abovementioned patent in the much lower effective resistance of the phasing circuit which produces sharp bends in the phasing curve as indicated at $b$ of the phasing curve B. It will be noted that the characteristic B changes abruptly at two points $b$ at almost right angles, and I propose to shift this characteristic in such manner that one of the bends $b$ will almost coincide with the terminus of the vector $E_n$ corresponding to network voltage as indicated by the broken curve $B_1$, so that the range of phasing voltages may be limited approximately to one quadrant. The manner in which the shifting of the characteristic B is accomplished is indicated in Fig. 5. Referring to the latter figure, the Scott connection of the auto-transformers 25 and 26 produces a voltage $E_{26}$, which may be shifted in position by the tap changing device of the auto-transformer 25 through a range of phase angles almost corresponding to one remaining phase of network voltage indicated by the reference character $E_c$.

The phasing filter 24 prevents closure of the protector circuit breaker 8 in the event that any conductors of the feeder 2 have been transposed in repairing a feeder fault. As an additional precaution, the energizing circuit of the closing coil 9 is connected phase-to-phase between a feeder conductor and a network conductor of different phase. This connection alone prevents closure of the circuit breaker under certain conditions of transposed feeder phases, as will be obvious.

The taps of the auto-transformer 26 act to produce an adjustable voltage differential between the main transformer secondary voltage, and the network voltage, thereby producing a shift of the curve B upward so that its acute angle $b$ approximately coincides with the terminus of the vector $E_c$. It will be seen that this arrangement limits the range of effective phasing voltages to approximately the upper left quadrant, in the same manner as a separate phasing relay.

Returning to Fig. 2, the potential windings 14 of the master relay 12 are connected in series with suitable capacitors 30 to the conductors of the network 1. The capacitors 30 serve to shift the flux produced by the potential coils 14 from a lagging vector position, which would result from the inductance of the potential coils, to a vector position approximately in phase with the network voltage, as is necessary for power directional response with an element of the inductor loop type. A set of current transformers 31 is provided for energizing the restraining device 19 and the current windings 15 of the master relay 12.

The usual back-up fuses 32 are interposed between the network circuit breaker 8 and the network 1, for the purpose of interrupting the connection of the network 1 and feeder 2 in the event that the network circuit breaker 8 fails to open in response to a feeder fault. The fuses 32 are preferably designed to blow at a current value corresponding to approximately 300% of the rating of the transformer bank 3, in the usual manner.

A plurality of conducting links 33, 34 and 35 are provided for changing the protector circuits to correspond to various desired operation characteristics without disturbing the protector permanent wiring.

The operation of the apparatus shown in Fig. 2 may be set forth as follows: It is assumed that, initially, the network 1 and feeder 2 are deenergized, and the various relays and switches are in the position shown in the figure. If the feeder 2 becomes energized, a secondary voltage appears across the secondary terminals of the transformer bank 3 and a circuit for the operating coil of the closing relay 11 is completed from the $c$-phase transformer secondary terminal through back contacts $8a$ of the circuit breaker 8, the operating coil of the relay 11, closing contacts of the master relay 12 and thence through any load circuits which may be connected to the network 1 to ground and return to the grounded neutral point of the windings of transformer 3. It will be understood that the network 1 is the supply circuit for a metropolitan distribution area, and that for the very short intervals of time in which this network may be deenergized, there is always a large connected load between the network and ground, providing an adequate return circuit for the closing circuit described above. It will be noted that, as the network 1 is deenergized, the overvoltage device 18 of the master relay 12 is ineffective to overcome the bias of the spring 17, and the closing contacts of the relay 12 are accordingly held in engaged position.

Upon completion of the circuit of the energizing coil of the closing relay 11, the latter closes establishing a holding circuit for itself through its contacts $11a$, independent of the master relay 12. The closing relay 11, in closing, completes a circuit for the closing solenoid 9 of the network circuit breaker, and the latter closes.

If a fault occurs on the network 1, the flow of current is no longer limited by the impedance of the load, and the fault current rises to a value limited principally by the reactance of the conductors of feeder 2 and of the transformer bank 3. This reactance is ordinarily of the order of 5 to 10%, and the fault current accordingly is of the order of 10 to 20 times normal full load. This large fault current, whether the fault is symmetrical or unsymmetrical, produces saturation of the iron core of the reactance device 21, and accordingly causes the unbalance relay 23 to open. The unbalance relay 23, in opening, interrupts the restraining connections of the master relay 12, thereby putting the latter in condition for operation in response to power values of low magnitude. However, the direction of power flow now is toward the network 1, and the network circuit breaker 8, accordingly, remains closed. The fault is burned off in the usual manner.

If a fault occurs on the feeder 2, the direction of power flow reverses, and the current again rises to fault magnitudes. In response to this large value of current, the unbalance relay 23 operates in the manner described above to open the restraining circuits for the master relay 12. Under these conditions, however, the direction of power is reversed, and the master relay 12 operates at high speed to complete an energizing circuit for the trip coil 10 of the circuit breaker 8. The circuit breaker 8, accordingly, trips open interrupting the connection of the network 1 and transformer bank 3 and establishing a phasing circuit through the upper phasing winding 16 of the master relay 12. The master relay 12 now operates in accordance with the characteristic B of Fig. 5 to compare the magnitude and phase relationship of the feeder and network voltages. Referring to Fig. 5, it will be seen that a closing circuit for the closing relay 11 can be completed only if the vector $E_t$, corresponding to transformer secondary voltage, terminates in approximately the upper left quadrant with reference to the vector $E_c$ corresponding to network voltage. When the relationship of feeder and network voltages is such as to produce a closing operation of the master relay 12, a closing circuit for the closing relay 11 is completed in the manner described above, and the network circuit breaker 8 is closed.

Fig. 3 shows a modification of the network protector shown in Fig. 2, in which the phasing filter 24 is omitted, and phasing impedances 36 substituted. It will be understood that the phasing impedances 36 have impedance values suitable to limit the current in the various phasing circuits to values safe for the phasing windings 16, under any conditions of transposed voltage which may be encountered. The impedance phase angles of the impedances 36 is such as to produce a closing characteristic of any desired phase position dependent upon the characteristics of the relay 12. Assuming the relay 12 is of the inductor loop type, as described, and that it is desired that the relay closing characteristic lag the network voltage by an angle of the order of 70° to 80°, the impedance phase angle of the impedances 36 should be approximately 60°.

I do not intend that the present invention shall be restricted to the specific structural details, arrangement of parts or circuit connections herein set forth as various modifications thereof may be effected without departing from the spirit and scope of my invention. I desire, therefore, that only such limitations shall be imposed as are indicated in the appended claims.

I claim as my invention:

1. In apparatus for controlling the connection of a pair of alternating-current circuits, a device responsive to the directional relationship of a pair of alternating electrical parameters, mutual impedance means having a voltage-transformation ratio other than unity, and phasing circuit means for energizing said device in accordance with a plurality of voltage parameters derived from said circuits, said phasing circuit means including said impedance means.

2. The combination defined in claim 1 in which the mutual impedance means is a tapped impedance.

3. The combination defined in claim 1 in which the mutual impedance means is an auto-transformer.

4. In an alternating-current network system having a polyphase grounded-neutral supply circuit and a polyphase grounded-neutral network circuit, a circuit interrupter for connecting said circuits, and control means for said circuit interrupter including electroresponsive means effective during a closing operation, a phasing device responsive to a plurality of voltage parameters derived from said circuits, and a closing circuit connected to be energized in accordance with a different voltage parameter derived from both of said circuits, said closing circuit including said electroresponsive means.

5. In an alternating-current network system having a polyphase grounded-neutral supply circuit and a polyphase grounded-neutral network circuit, a circuit interrupter for connecting said circuits, and control means for said circuit interrupter including electroresponsive means effective during a closing operation, a device responsive to the directional relationship of a pair of alternating electrical parameters, phasing circuit means for energizing said device in accordance with a plurality of voltage parameters derived from said circuits, and a closing circuit connected to be energized in accordance with a different voltage parameter derived from both of said circuits, said closing circuit including said electroresponsive means.

6. In apparatus for controlling the connection of a pair of three-phase alternating-current circuits, a device responsive to the directional relationship of a pair of alternating electrical parameters, mutual impedance means connecting a first phase of one of said circuits with a second phase of one of said circuits, said impedance means including an intermediate connection, a second impedance means connecting said intermediate connection to the third phase of one of said circuits, said second impedance means having an intermediate tap, an energizing circuit for said device connecting said intermediate tap to the third phase of the second of said circuits, and another energizing circuit for said device responsive to a voltage parameter derived from said circuits.

7. In apparatus for controlling the connection of a pair of three-phase alternating-current circuits, a device responsive to the directional relationship of a pair of alternating electrical parameters, mutual impedance means connecting a first phase of one of said circuits with a second phase of one of said circuits, said impedance means including an intermediate connection, a second impedance means connecting said intermediate connection to the third phase of one of said circuits, said second impedance means having an intermediate tap, an energizing circuit for said device connecting said intermediate tap to the third phase of the second of said circuits, said energizing circuit having a variable impedance component of non-linear voltage current characteristic and a component in quadrature to said variable component, and another energizing circuit for said device responsive to a voltage parameter derived from said circuits.

8. The combination defined in claim 7, in which the variable impedance is a saturable reactor.

9. The combination defined in claim 7, in which the first-mentioned mutual impedance means is an auto-transformer.

10. The combination defined in claim 7, in which the second mutual impedance means is an auto-transformer.

MYRON A. BOSTWICK.